United States Patent [19]

Swift et al.

[11] Patent Number: 4,777,974
[45] Date of Patent: Oct. 18, 1988

[54] STAGED PRESSURE RELIEF ASSEMBLY

[75] Inventors: Ian Swift; Robert L. De Good, both of Blue Springs, Mo.

[73] Assignee: Fike Corporation, Blue Springs, Mo.

[21] Appl. No.: 125,716

[22] Filed: Nov. 27, 1987

Related U.S. Application Data

[63] Continuation of Ser. No. 849,565, Apr. 8, 1986, abandoned.

[51] Int. Cl.⁴ .............................................. F16K 17/40
[52] U.S. Cl. .................................... 137/14; 137/68.1; 220/89 A
[58] Field of Search .............. 137/68.1, 14; 220/89 A

[56] References Cited

U.S. PATENT DOCUMENTS

| | | | |
|---|---|---|---|
| 1,584,523 | 5/1926 | Egbert | 220/89 A |
| 2,766,904 | 10/1956 | Philip | 137/68.1 X |
| 2,954,897 | 10/1960 | Hausen | 220/89 A |
| 3,362,742 | 1/1968 | Sanderson | 137/68.1 X |
| 3,445,032 | 5/1969 | Raidl | 137/68.1 X |
| 3,698,598 | 10/1972 | Wood | 137/68.1 X |
| 4,498,261 | 2/1985 | Wilson | 220/89 A X |

FOREIGN PATENT DOCUMENTS 388160 10/1973 U.S.S.R. ............................ 137/68.1

OTHER PUBLICATIONS

Abstract Ouger, Pressure relief, 97051, 1-22-52.

*Primary Examiner*—John Rivell
*Attorney, Agent, or Firm*—Hovey, Williams, Timmons & Collins

[57] ABSTRACT

A pressure relief panel assembly for rupture discs, explosion vents and the like has a plurality of frangible panel portions which burst at different pressures to present a pressure relieving aperture having a cross-sectional area which varies in accordance with the number of panel portions which have ruptured. In one embodiment of the invention, the assembly comprises two frangible panels positioned in face-to-face relationship in covering disposition to a vent opening, and the innermost panel has an orifice which functions as a pressure relieving aperture once the outermost panel ruptures; subsequently, further build up of pressure causes the innermost panel to burst and present a pressure relieving aperture larger than the orifice so that the structure to be protected is fully vented. In certain forms of the invention, a discontinuous pattern of perforated lines of weakness in the innermost panel serve as pressure relieving apertures once the outermost panel ruptures. In another embodiment, the assembly comprises a single panel having one set of weakness lines defining a first frangible panel portion and a second set of weakness lines surrounding the first set and defining a second frangible panel portion.

1 Claim, 2 Drawing Sheets

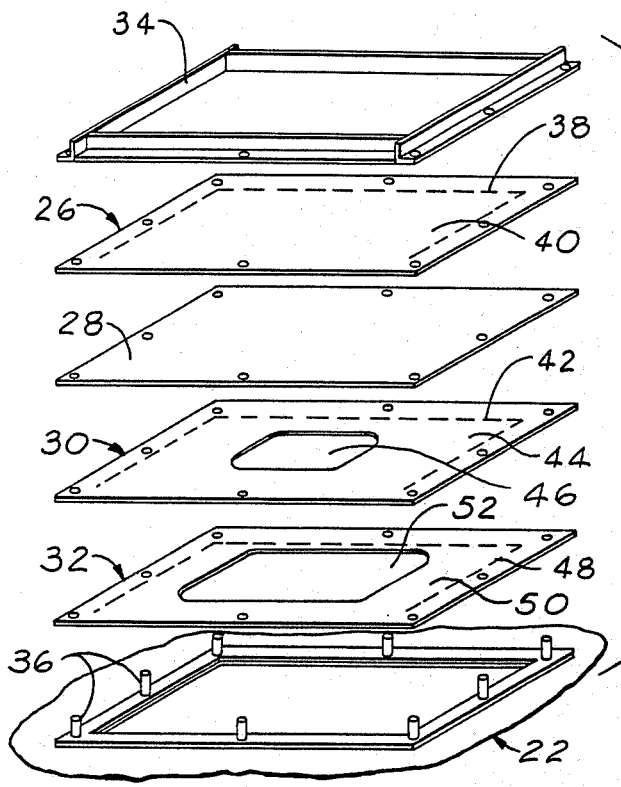
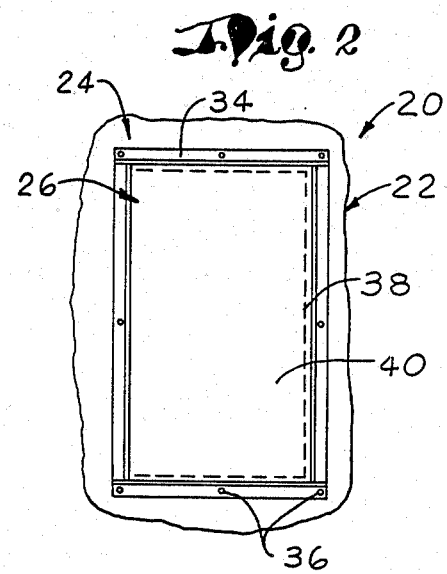
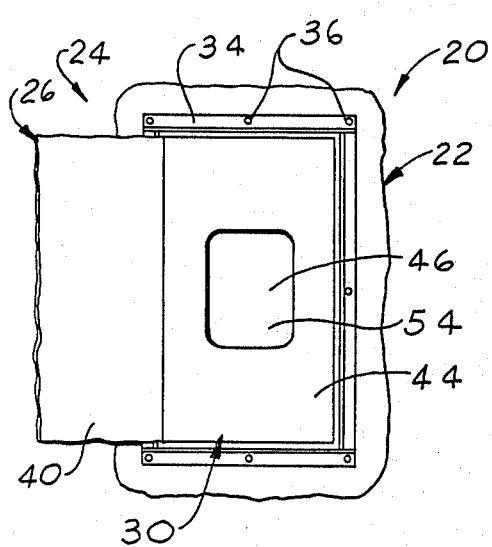
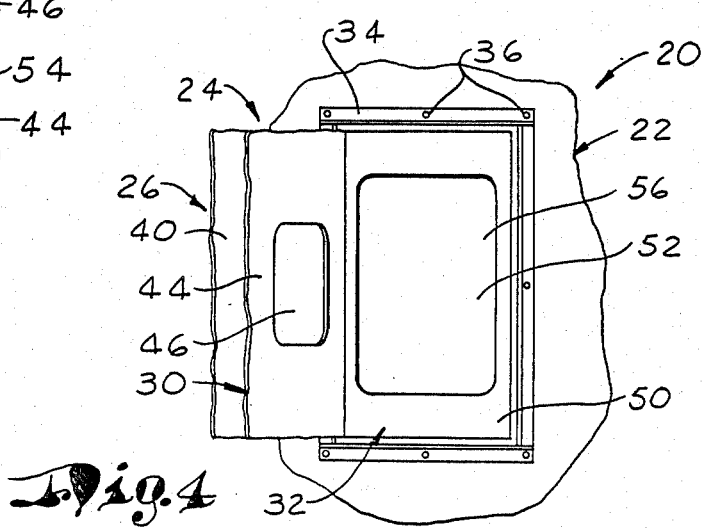

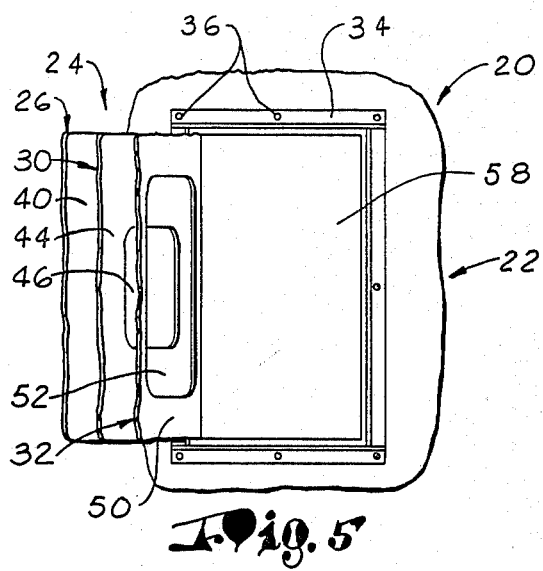
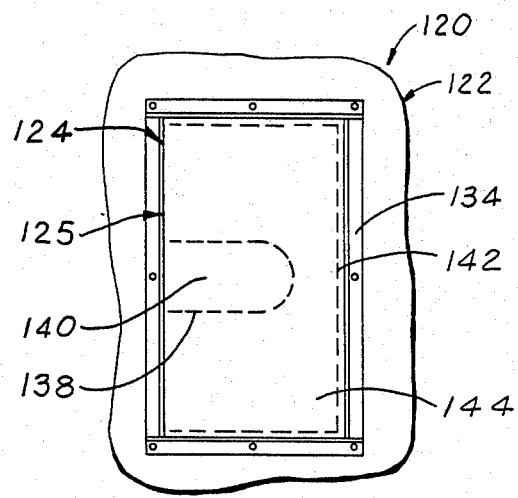
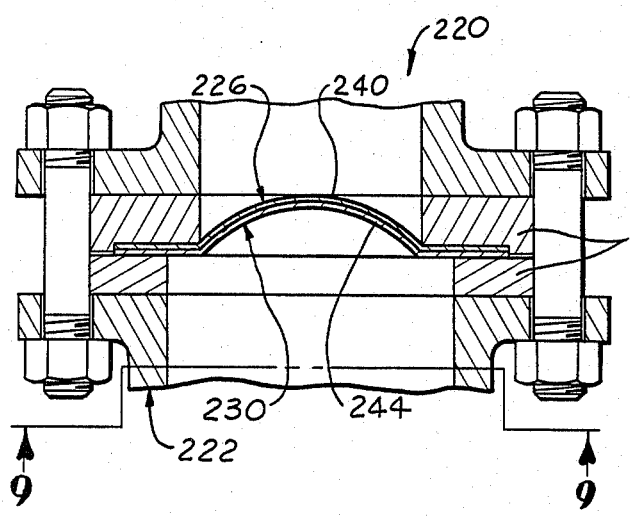
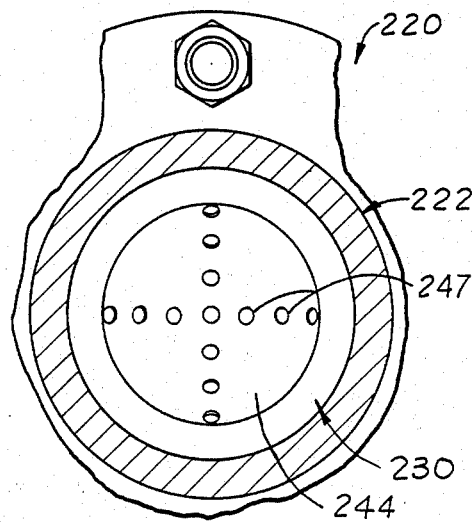
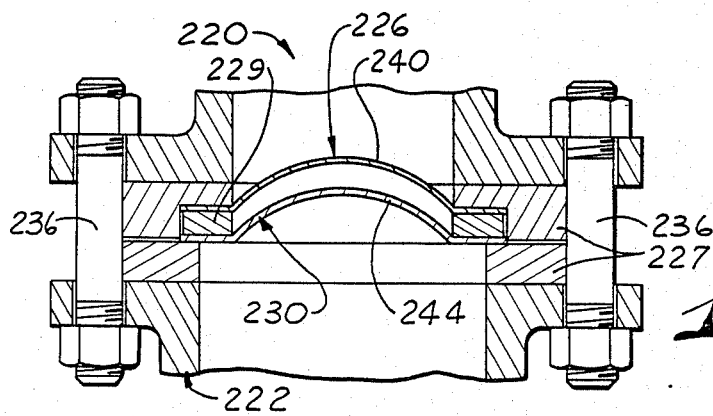

STAGED PRESSURE RELIEF ASSEMBLY

This application is a continuation of application Ser. No. 849,565, filed Apr. 8, 1986, now abandoned.

BACKGROUND OF THE INVENTION

1. Field of the Invention

This invention relates to a pressure relief assembly for protection against potentially dangerous fluid pressure buildup within an enclosure, wherein the assembly comprises a first frangible portion rupturable at a first, certain pressure to present a venting aperture having a first cross-sectional area, as well as a second frangible portion rupturable at a pressure higher than the first pressure to present a pressure relieving aperture of a cross-sectional area larger than the aperture presented on rupture of the first frangible portion. Staged release of the two frangible portions at different pressures amply vents the enclosure with a minimum of fluid turbulence and, where the enclosure partially contains liquids, substantially reduces the likelihood of two-phase outflow of the pressurized contents.

2. Description of the Prior Art

Devices for relieving pressure within a fluid vessel, piping or other types of structure often include sheets, panels or discs that are frangible and rupture or burst at a pressure which is low enough to prevent explosion of the vessel or other enclosure defining structure. Such frangible members can take the form of rupture discs or burst panels; in any case, frangible venting assemblies have been known to provide a predictable relief area upon initial rupture at a specified level of pressure.

Examples of rupture discs known in the art are found in U.S. Pat. Nos. 4,512,491, dated Apr. 23, 1985, 4,505,180 dated Mar. 19, 1985 and 3,109,553 dated Nov. 5, 1963, all of which are assigned to the assignee of the present invention. Such rupture disc assemblies typically comprise either a single frangible disc or a pair of frangible discs mounted in face-to-face, spaced relation, and often the discs are provided with lines of weakness to provide a more predictable and instantaneous response to bursting at a given pressure level internally of a vessel to be protected. The lines of weakness enable the disc to fully open when the design pressure is reached, so that a maximum of vent cross-sectional area enables the buildup of fluid pressure within the vessel to be quickly relieved.

Other types of frangible venting assemblies include burst panels of the type shown in U.S. Pat. No. 4,067,154, dated Jan. 10, 1978 and also assigned to the assignee of the instant invention. Burst panels are commonly used to protect pressure buildup in equipment such as bag houses, cyclone-type separators and other dust collecting equipment which typically operate at pressures lower than vessels protected by rupture discs. Burst panels are often provided with score patterns, perforations or other types of weakness lines so that the panel bursts with a relatively high degree of predictability at a certain design pressure.

While the frangile pressure relief assemblies described in the aforementioned U.S patents provide a valuable function by protecting both equipment as well as personnel, it is believed that in certain circumstances it would be desirable to avoid fully opening the vent area during the initial stages of pressure buildup. For example, in the case of burst panels for explosion vents, it has been observed that the large opening presented by the burst panels after rupture of the latter causes gas to escape through the vent at a relatively large rate of flow, and unfortunately the large outflow of gas in the vessel occasionally enhances turbulence which in turn undesirably accelerates the combustion process.

Similarly, rupture disc assemblies, such as those used to protect liquid-containing vessels which can be subject to pressure, are constructed to fully open at a certain design pressure that is substantially below the burst pressure of the vessel. However, if the liquid within the vessel is exposed to pressures greater than atmospheric pressure, the liquid may undergo rapid depressurization as soon as the rupture disc assembly opens. During this process, bubbles sometimes form within the bulk of the liquid to re-establish equilibrium of pressure between the liquid and the gas, and consequently during rapid depressurization of the vessel, the liquid will froth up suddenly, causing the liquid and gas to escape together through the vent opening provided by the rupture disc assembly. Such two-phase flow is dangerous to operating personnel and also in some instances represents a potentially costly loss of materials.

It has also been proposed in the past to provide two separate rupture disc assemblies at spaced locations on a vessel to be protected, wherein a disc of one of the assemblies is constructed to burst at a first pressure and a disc of the other assembly is intended to rupture at a second, higher pressure in an effort to provide a failsafe, "backup" system for relieving pressure in the vessel in instances where the first assembly for some reason fails to rupture. However, such dual systems must incorporate two separate piping means for discharging the outflowing liquid and gas, thereby increasing the overall cost of the system. Moreover, provision of two separate rupture disc assemblies increases the likelihood of leakage and more or less doubles the expenditures for installation and maintenance.

As can be appreciated, it would be a desirable advance in the art to provide a pressure relief assembly for vessels, fluid conduits as well as other types of equipment subject to fluid pressure buildup which would avoid the problems presented hereinabove. Explosion vents, for instance, would desirably be constructed to avoid contributing turbulence to the combustion process within the vessel. Also, rupture disc assemblies would advantageously be constructed to substantially preclude two-phase flow of contents through the vent opening of reactor vessels, tanks and the like.

SUMMARY OF THE INVENTION

The present invention overcomes the abovenoted disadvantages by provision of a pressure relief assembly having at least two frangible panel portions which are rupturable at different pressures. The cross-sectional area of the pressure relieving aperture presented by the rupturable panel portions is varied in accordance with the degree of pressure within the vessel or other equipment to be protected.

As a result, use of the staged pressure relief assembly of this invention for an explosion vent enables the size of the vent to be controlled in accordance with the flow rate of gas produced by the combustion process. When the fluid pressure within the enclosure bounded by the equipment reaches a first value, a first frangible portion is ruptured to present an aperture having a first cross-sectional area which is relatively small but adequate for enabling the outflow of combustion gases at the rate the latter are expanding. The relatively small outflow of gas permitted by the first cross-sectional area presented by the ruptured first frangible portion minimizes turbulence of the combustion gases which in turn avoids enhancement of the burning process. However, as the combustion process continues and the fluid pressure buildup within the equipment continues to rise, a second frangible panel portion ruptures to present a venting aperture of a second cross-sectional area substantially larger than the first cross-sectional area, so that the equipment is at all times protected against exposure to fluid pressures which could otherwise lead to explosion of the equipment itself.

When the staged pressure relief assembly of the present invention is alternatively utilized for protecting a liquid-containing vessel exposed to pressure increases, such as would be found in applications heretofore using conventional rupture discs, the staged pressure relief assembly minimizes the probability that two-phase outflow of both liquid and pressurized gas will occur when the design burst pressure is reached. The two frangible portions rupture at different pressures to initially present first venting aperture and subsequently present a larger venting aperture and thus depressurize the liquid within the vessel at a rate significantly slower than conventional rupture discs, so that equilibrium of pressure between the liquid and gas is facilitated. Relatively slow depressurization of the liquid contents of the vessel avoids likelihood of frothing of the liquid; consequently, the vented materials can be more easily controlled and the use of somewhat smaller vents is also possible.

BRIEF DESCRIPTION OF THE DRAWINGS

FIG. 1 is a fragmentary exploded view of the staged pressure relief assembly of the present invention according to one embodiment thereof, wherein three frangible panels each having substantially identical lines of weakness are mounted to structure to be protected;

FIG. 2 is a reduced, fragmentary, elevational view of the pressure relief assembly shown in FIG. 1 as the same appears before any of the frangible panels are ruptured;

FIG. 3 is a view similar to FIG. 2 wherein the first frangible panel has burst to present to a pressure relieving aperture that is defined by an orifice formed in the second frangible panel;

FIG. 4 is a view similar to FIG. 3 wherein the second frangible panel has been ruptured to thereby present a pressure relieving aperture defined by an orifice which is formed in the third frangible panel;

FIG. 5 is a view similar to FIG. 4 wherein the second frangible panel portion has been ruptured to fully open the pressure relief assembly;

FIG. 6 is an elevational view of the staged pressure relief assembly of the present invention according to another embodiment, wherein a single panel has lines of weakness defining two frangible portions;

FIG. 7 is a fragmentary, side cross-sectional view of the present invention according to another embodiment wherein two rupture discs are mounted on a vessel to be protected in face-to-face relationship to each other;

FIG. 8 is a view similar to FIG. 7 wherein the rupture discs are held in spaced relationship to each other, in accordance to another form of the invention; and FIG. 9 is a elevational view taken along line 9—9 of FIG. 7.

DETAILED DESCRIPTION OF THE DRAWINGS

A pressure relief assembly 20 according to one embodiment of the present invention is shown in FIGS. 1-5 and is adapted to be mounted in covering disposition to a vent opening of a structure 22, the latter of which may take the form of equipment such as bag houses, cyclone-type separators and the like. In particular, the structure 22 has an enclosure subject to the build up of fluid pressure, and the enclosure is in communication with the vent opening of the structure 22 so that the assembly 20 prevents pressure in the enclosure from attaining levels which would otherwise burst or damage the structure 22.

Viewing FIG. 1, the pressure relief assembly 20 comprises a panel means 24 which extends across the vent opening of the structure 22. The panel means 24 includes a first, generally planar panel 26, a gasket 28 optionally comprised of teflon, a second generally flat panel 30 and a third, substantially planar panel 32. The assembly 20 also includes a frame 34 and a plurality of bolts 36 which extend through mating holes in the panels 26, 30, 32, the gasket 28 and the frame 34. The bolt 36 and the frame 34, along with nuts (not shown) that threadably secure the panel means 24 to the bolts 36, comprise a means releasably mounting the panel means 24 to the structure 22.

The first panel 26, as best shown in FIG. 1, has a somewhat U-shaped pattern of scored lines of weakness 28 which define a first frangible panel portion 40. The second panel 30 has a U-shaped pattern of weakness lines 42 which define a second frangible portion 44, and a generally rectangular orifice 46 formed in the second frangible portion 44 has a first, cross-sectional area. The third panel 32 has a generally U-shaped pattern of weakness lines 48 which define a third frangible panel portion 50, and a generally rectangular orifice 52 of a certain, second cross-sectional area is disposed in the third panel portion 50. The cross-sectional area of the orifice 52 is larger than the area of the orifice 46.

When the assembly 20 is secured to the structure 22, the panels 26, 30, 32 are in parallel, face-to-face disposition covering the vent opening of the structure 22 and the gasket 28 normally precludes leakage of fluid from the enclosure bounded by the structure 22, as is desirable when the weakness lines 28, 42, 48 comprise spaced perforations with tabs extending between adjacent perforations. The U-shaped pattern of weakness lines 38 are more or less in register with the pattern defining the weakness lines 42 and the weakness lines 48. FIG. 2 depicts the assembly 20 in its normal, non-ruptured configuration, as would occur before the enclosure bounded by the structure 22 is subject to a potentially dangerous or damaging pressure of fluid.

As soon as the fluid pressure within the structure 22 reaches a first certain pressure, the first frangible portion 40 ruptures along the weakness lines 38 and folds back to the configuration shown in FIG. 3. The orifices 46, 52 communicate pressure within the enclosure bounded by the structure 22 to the first frangible portion and cause the latter to rupture at the first, certain pressure, simultaneously bursting the gasket 28. As shown, the orifice 46 of the second frangible portion 44 thus presents a pressure relieving aperture 54 which has a first cross-sectional area substantially equal to the area of the orifice 46.

The orifice 46, being of a limited cross-sectional area, is operable to enable a certain flow rate of fluid through the pressure relieving aperture 54. However, when pressure within the structure 22 continues to rise and increases to a second, certain pressure, the second frangible portion 44 bursts and folds open to the configuration shown in FIG. 4. As such, the orifice 52 in the third panel 32 thus functions as a pressure relieving aperture 56 which has a second, certain cross-sectional area that is greater than the area presented by the first aperture 54 depicted in FIG. 3. Consequently, the aperture 56 enables a greater flow rate of fluid to flow through the venting assembly 20 so that the pressure within the structure 22 is retained below potentially damaging levels.

Further buildup of pressure within the enclosure bounded by the structure 22 exerts a force on the third frangible portion 50 and causes the latter to rupture once the pressure within the structure 22 reaches a third, certain value. The third frangible portion 50 bursts open to the configuration shown in FIG. 5 and thereby presents a pressure relieving aperture 58 of a cross-sectional area that is larger than either of the apertures 56, 54. Once the third frangible portion 50 ruptures, the assembly 20 is fully opened, and the aperture 58 is sized to provide full venting relief for protection of further pressure increases within the structure 22.

It has been found that best results are obtained when the panels 26, 30 and 32 are each of a configuration different from each other (besides the differences inherent in the unequally sized orifices 40, 52) so that each of the panels 26, 30 and 32 rupture at non-equal values of pressure. The burst pressure of the panels 26, 30, 32 may be varied by varying the respective lines of weakness 38, 42, 48 such that the lines 38 are perforations spaced between tabs that are wider in area than tabs between perforations in the pattern of weakness lines 42. Alternatively, the first panel 26 may be thinner than the second panel 30, or optionally comprised of a material different than the second panel 30. Similarly, the third panel 32 can be of a slighlty different configuration than the second panel 30. As such, the first panel 26 will rupture at a first, certain pressure and the second panel 30 will rupture at a second, certain pressure higher than the first pressure, and finally the third panel 32 will burst at a third pressure that is higher than the burst pressure of the second panel 30.

Another embodiment of the present invention is shown in FIG. 6 and includes a pressure relief assembly 120 adapted to be mounted in covering disposition to a vent opening of a structure 122. The structure 122 has an enclosure (not shown) that is subject to the build up of fluid pressure.

The assembly 120 comprises a panel means 124 which includes a single panel 125 that extends across the vent opening of structure 122. A frame 134 releasably mounts the panel 125 to the vent opening of structure 122.

The panel 125 has a U-shaped pattern of lines of weakness 138 which define a generally U-shaped, first frangible portion 140 in the panel 125. The panel 125 also has a second, generally U-shaped pattern of weakness lines 142 disposed in surrounding relation to the weakness lines 138 for defining a second frangible panel portion 144 larger than the first frangible portion 140. In this embodiment, the weakness lines 138, 142 are optionally small, discontinuous grooves that are formed within the panel 125 but which do not completely perforate the latter.

During use of the assembly 120, the panel 125 remains in a flat, unbroken configuration when the pressure within the structure 122 is below a first, certain value. Whenever fluid pressure within the structure 122 rises to a first, certain value, the first frangible portion 140 will rupture along weakness lines 138, and present a pressure relieving aperture of a first cross-sectional area. As pressure within the assembly 120 rises above the first pressure value and reaches a second, certain pressure, the second frangible panel portion 144 will burst along weakness lines 142 and present a pressure relieving aperture that is larger than the pressure relieving aperture presented upon rupture of the first frangible portion 140. As a result, the staged rupture of the two frangible portions 140, 144 at pressures which are different than each other enables the pressure relieving aperture of the assembly 120 to be varied in accordance with the fluid pressure within structure 122.

FIG. 7 illustrates a pressure relief assembly 220 of the present invention according to another embodiment thereof wherein the assembly 220 provides protection against potentially dangerous fluid pressure build up within a vessel or structure 222. Specifically, the assembly 220 has a bulged rupture disc or first panel 226, and a second rupture disc or bulged panel 230 that is substantially similar in shape to the first panel 226. A plurality of bolts 236 releasably clamp the structure 222, the bulged panels 226, 230 and a pair of clamping rings 227 to a venting, discharge fluid conduit 223.

The first panel 226 has a first frangible portion 240 that ruptures when fluid pressure within the structure 222 reaches a certain, first value. The second disc or panel 230 has a second frangible portion 244 which ruptures when fluid pressure within the structure 222 reaches a second, certain pressure that is higher than the first, certain pressure.

Viewing FIG. 9, the second frangible portion 244 of the second panel 230 is provided with lines of weakness which comprise a cross-shaped pattern of spaced orifices 247. The orifices 247 communicate pressure within the structure 222 to the first frangible portion 240 to enable the latter to rupture at the first, certain pressure; thereafter, the orifices 247 together provide a pressure relieving aperture of a certain, first cross-sectional area.

As pressure within the structure 222 continues to rise, the second frangible portion 244 will burst and open in petal configuration along the lines of weakness presented by orifices 247. The second frangible portion 244 opens to thereby present a pressure relieving aperture of a second cross-sectional area that is greater than the aforementioned first cross-sectional area, the latter comprising a summation of the total area presented by the orifices 247. Consequently, the crosssectional area of the pressure-relieving aperture presented by the assembly 220 will vary in accordance with the pressure within the structure 222.

FIG. 8 represents another embodiment of the invention which is substantially identical to the embodiment shown in FIG. 7 with the exceptions as noted hereinafter. The reference numbers shown in FIG. 8 thus represent components generally identical to the components represented by equal reference numbers in FIG. 7.

However, in FIG. 8, the first rupture disc or bulged panel 226 is separated from the second rupture disc or bulged panel 230 by means of a spacer ring 229. The ring 229 functions to readily establish pressure equilibrium throughout the entirety of the space between the first panel 226 and the second panel 230 and the enclosure bounded by the structure 222. That is, pressure within the structure 222 is transmitted through the orifices 227 to bear against the entire frangible portion 40 of the first panel 226 and rupture the same whenever the pressure reaches the aforesaid mentioned first, certain value.

In the embodiments shown in FIGS. 7-9, the first rupture disc panel 226 can be constructed to rupture at a pressure different than the bursting pressure of the second rupture disc panel 230 by a variety of means, such as those disclosed above with reference to the embodiments shown in FIGS. 1-5. For example, the second panel 230 can be of a thickness greater than the thickness of the panel 226, or alternatively may be comprised of a different material than the panel 226. Also, the first rupture disc panel 226 may be provided with scored or grooved lines of weakness to insure rupture at a pressure lower than the burst pressure of the panel 230.

It should now be appreciated that the present invention provides staged pressure relief for protection against fluid pressure build up, and may be adapted for use as a burst panel in a system utilizing relatively low operating pressures, such as dust collection equipment, as well as a rupture disc assembly for systems involving relatively high pressures, such as those encountered in connection with reaction vessels. It should be equally apparent, however, that various minor modifications could be made to the details of construction of the particular, currently preferred embodiments described herein above for illustrative purposes, without departing from the real spirit or essence of the invention. Accordingly, it is to be understood that the invention should be construed as extending to the subject matter defined by the claims which follow and the mechanical equivalents thereof.

We claim:

1. A method for preventing build up of gaseous pressure within an enclosure to a potentially dangerous level under conditions where the pressure rise occurs as a result of a continuous although relatively rapid expansion of gases confined within the enclosure, said method comprising the steps of:

providing a full flow gas vent opening in an enclosure containing a quantity of gases, said opening located above the normal level of any liquid in the enclosure and being of a size such that when open for release of gases from the enclosure therethrough, gases increasing in pressure within the enclosure will not reach said potentially dangerous level and relief of gases therethrough will not be in the form of deleterious turbulent flow; and providing a selectively frangible panel means over said opening in normally gas sealing relationship thereto and normally out of contact with any liquid in said enclosure, said panel means including a first section constructed and arranged such that as the pressure commences to rise in the enclosure, the first section will open at an initial predetermined first lower level pressure to define a restricted flow aperture of lesser size than said full flow vent opening but sufficient to minimize turbulent flow of gas therethrough during critical venting of the enclosure, said panel means further including a second section of dimensions substantially equal to that of the full gas vent opening and constructed and arranged such that only when the gaseous pressure in the enclosure reaches a second predetermined higher value even though such gases are being vented through the aperture presented by opening of the first section, the second section opens to thereby allow the continuously expanding gases to thereafter vent from the enclosure through said full vent opening.

* * * * *